United States Patent
Huang et al.

(10) Patent No.: US 10,540,313 B2
(45) Date of Patent: Jan. 21, 2020

(54) COMPUTING DEVICES WITH MOVABLE INPUT/OUTPUT CONNECTORS

(71) Applicant: Hewlett-Packard Development Company, L.P., Houston, TX (US)

(72) Inventors: Shih Chuan Huang, Taipei (TW); Yu Cheng Wu, Taipei (TW); Chih Sheng Liao, Taipei (TW); Hsin Wen Hsu, Taipei (TW); Benjiman White, Vancouver, WA (US); William E. Hertling, Portland, OR (US); Mike Whitmarsh, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/762,035

(22) PCT Filed: Dec. 11, 2015

(86) PCT No.: PCT/US2015/065307
§ 371 (c)(1),
(2) Date: Mar. 21, 2018

(87) PCT Pub. No.: WO2017/099798
PCT Pub. Date: Jun. 15, 2017

(65) Prior Publication Data
US 2018/0276168 A1    Sep. 27, 2018

(51) Int. Cl.
*G06F 1/16*    (2006.01)
*G06F 13/40*    (2006.01)

(52) U.S. Cl.
CPC ............................... *G06F 13/4068* (2013.01)

(58) Field of Classification Search
CPC ...... G06F 19/00; G06F 13/4068; H01R 41/00
USPC .......................................................... 710/305
See application file for complete search history.

(56) References Cited

U.S. PATENT DOCUMENTS

| 5,016,849 | A | * | 5/1991 | Wu ........................ F16M 11/10 248/176.3 |
| 5,267,127 | A | | 11/1993 | Pollitt |
| 6,093,038 | A | | 7/2000 | Chen et al. |
| 6,273,735 | B1 | | 8/2001 | Johnson et al. |
| 6,290,517 | B1 | | 9/2001 | Anderson |

(Continued)

FOREIGN PATENT DOCUMENTS

| TW | 456073 | 9/2001 |
| TW | M502870 | 6/2015 |
| WO | WO-2008127504 A1 | 10/2008 |

OTHER PUBLICATIONS

Belkin, "Flexible USB Cable Adapter" Available Online at: <https://www.belkin.com> Retrieved from the Internet on Sep. 15, 2015. 1 page.

*Primary Examiner* — Titus Wong
(74) *Attorney, Agent, or Firm* — HP Inc. Patent Department

(57) ABSTRACT

Example implementations relate to computing devices with movable input/output (I/O) connectors. For example, a computing device may include a chassis of the computing device and an I/O connector to connect an I/O device to the computing device. The I/O connector may be movable about an axis relative to the chassis by at least 180 degrees such that the I/O connector is accessible from multiple sides of the chassis.

21 Claims, 3 Drawing Sheets

(56) References Cited

U.S. PATENT DOCUMENTS

| | | | | |
|---|---|---|---|---|
| 6,356,793 | B1* | 3/2002 | Martin | G06F 1/1601 |
| | | | | 361/679.23 |
| 6,552,909 | B1* | 4/2003 | Liebenow | G06F 1/1616 |
| | | | | 361/679.02 |
| 6,644,999 | B1* | 11/2003 | Tan | H01R 13/5841 |
| | | | | 439/446 |
| 6,920,040 | B2 | 7/2005 | Kim | |
| 7,494,349 | B1* | 2/2009 | Huang | H01R 27/00 |
| | | | | 439/131 |
| 7,540,748 | B2 | 6/2009 | Tracy et al. | |
| 7,845,953 | B2 | 12/2010 | Brock et al. | |
| 7,887,332 | B2 | 2/2011 | Bauer et al. | |
| 2005/0112908 | A1* | 5/2005 | Yueh | H01R 35/04 |
| | | | | 439/8 |
| 2005/0157459 | A1 | 7/2005 | Yin et al. | |
| 2008/0013262 | A1* | 1/2008 | Stanford | G06F 1/1616 |
| | | | | 361/679.23 |
| 2008/0194119 | A1* | 8/2008 | Mori | G06F 13/4022 |
| | | | | 439/13 |
| 2012/0282805 | A1* | 11/2012 | Ku | H01R 35/02 |
| | | | | 439/586 |
| 2014/0022726 | A1* | 1/2014 | Huang | G06F 1/1656 |
| | | | | 361/679.55 |
| 2014/0104805 | A1* | 4/2014 | Row | H01R 13/516 |
| | | | | 361/807 |
| 2014/0120751 | A1* | 5/2014 | Senatori | G06F 1/1656 |
| | | | | 439/131 |
| 2017/0208697 | A1* | 7/2017 | Kurian | H02J 7/0044 |

\* cited by examiner

COMPUTING DEVICES WITH MOVABLE INPUT/OUTPUT CONNECTORS

BACKGROUND

A computing device may include input/output connectors to connect peripheral devices to the computing device such that the peripheral devices may operate with or through the computing device. For example, a computing device may include a connector to connect a keyboard to the computing device through a universal serial bus.

BRIEF DESCRIPTION OF THE DRAWINGS

Some examples of the present application are described with respect to the following figures.

DETAILED DESCRIPTION

As described above, a computing device may include input/output (I/O) connectors to connect peripheral devices to the computing device such that the peripheral devices may operate with or through the computing device. An I/O connector on a computing device is typically located at the rear of the computing device. While this may be convenient in some cases, in other cases, it may be inconvenient to a user who is sitting at the front of the computing device and would like to access a rear I/O connector.

Examples discussed herein include a computing device with movable I/O connectors. For example, a computing device may include an I/O connector to connect an I/O device to the computing device, where the I/O connector is movable about an axis that is relative to the chassis of the computing device by any suitable angle (e.g., by at least a 180 degree angle) such that the I/O connector is accessible from multiple sides of the chassis. This may allow a user to move the I/O connector to a position that may be more suitable to the user. For example, a user sitting at the front of a computing device may move the I/O connector from the rear of the computing device to the front of the computing device such that the user can more easily access the I/O connector. In another example, a user may move the I/O connector from the front of the computing device to a side or rear of the computing device to prevent any cables connected to the I/O connector from being visible.

Figure 1:
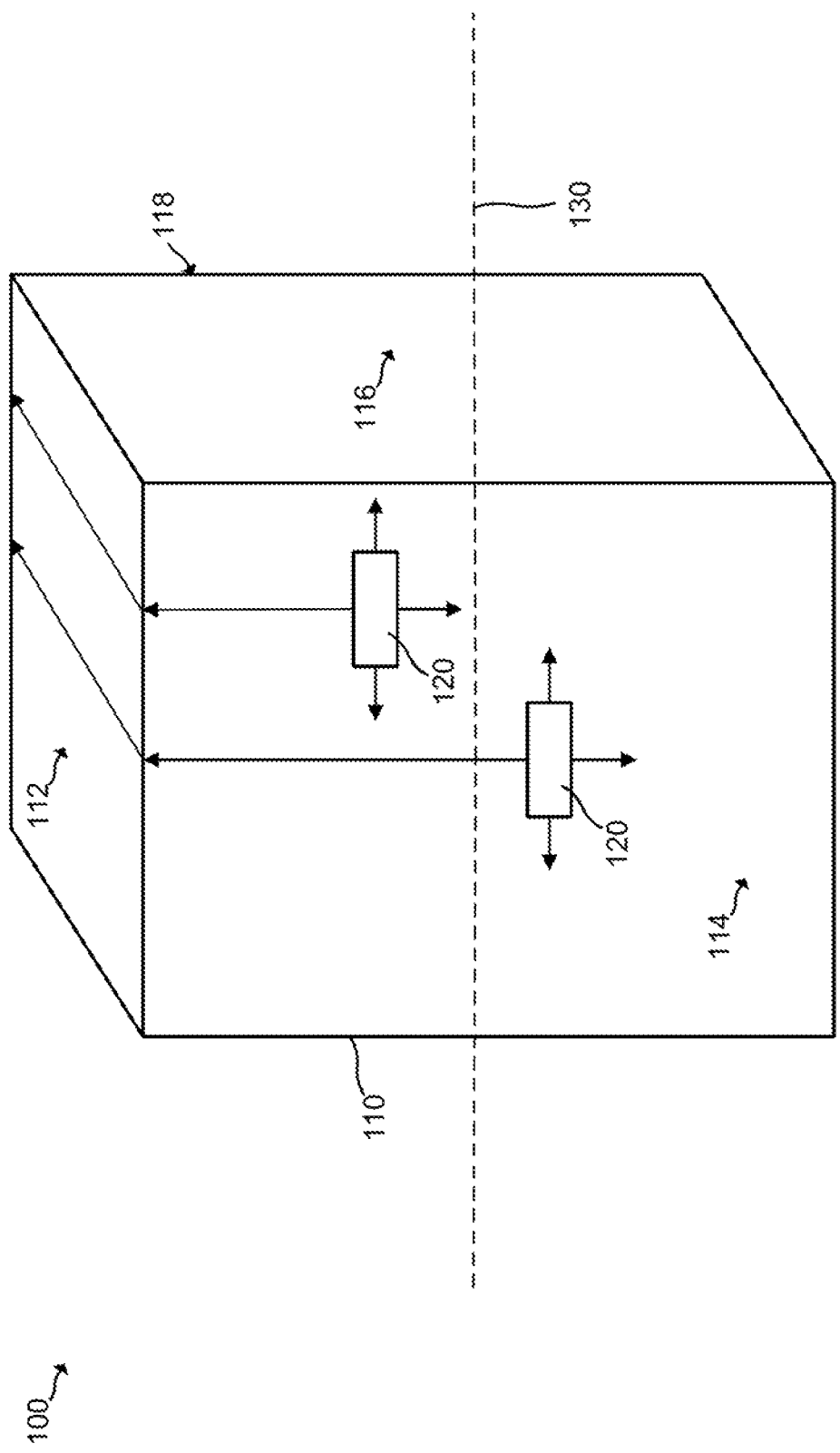
FIG. 1 is a block diagram of a computing device with movable input/output connectors.

Referring now to the figures, FIG. 1 is a block diagram of a computing device 100 with movable I/O connectors 120. The computing device 100 may be any suitable computing device, such as a desktop tower, a laptop, a monitor, a smartphone, a tablet, and the like. The computing device 100 may include a chassis 110 that serves as a cover to the computing device 100. The chassis 110 may have a top wall 112, a front wall 114, two side walls including side wall 116, a rear wall 118, and a bottom wall.

The computing device 100 may also include any number of I/O connectors 120. Each I/O connector 120 may be any suitable type of I/O connector, such as a high-definition multimedia interface (HDMI) connector, an audio connector, a universal serial bus (USB) connector, an alternating current (AC) connector, and the like. Each I/O connector 120 may be used to connect an I/O device (e.g., a keyboard, mouse, monitor, printer, etc.) to the computing device 100.

Each I/O connector 120 may be movable about an axis 130 by at least 180 degrees such that the I/O connector 120 may be accessible from multiple sides of the chassis 110. The axis 130 may be an axis that is located in any particular position relative to the chassis 110. For example, the computing device 100 may be a rectangular desktop tower, and the axis 130 may be parallel to the top wall 112 and may run through the center points of the side walls (e.g., side wall 116) of the chassis 110. The I/O connectors 120 may each be moved about or around the axis 130 through at least a 180 degree angle with respect to the axis 130. For example, an I/O connector 120 may be moved from the front wall 114 of the chassis 110 (e.g., at zero degrees with respect to axis 130) to the top wall 112 (e.g., at 90 degrees with respect to axis 130) and/or rear wall 118 (e.g., about, at, and/or beyond 180 degrees with respect to axis 130) of the chassis 110. While the axis 130 in FIG. 1 is shown to be located parallel to the top wall 112 and through the center points of the side walls of the chassis 110, the I/O connectors 120 may be moved about any suitable axis relative to the chassis 110. For example, the I/O connectors 120 may be moved between one side wall to another side wall about an axis that is parallel to the top wall 112 and that runs through the center points of the front wall 114 and the rear wall 118 of the chassis 110.

Each I/O connector 120 may be moved independently from other I/O connectors 120 and may be moved about the same axis (e.g., axis 130) or about a different axis. For example, one I/O connector 120 may be moved about axis 130, and an additional I/O connector 120 may be moved about a different axis that is parallel to the top wall 112 and that runs through the center points of the front wall 114 and the rear wall 118 of the chassis 110.

In some examples, the I/O connectors 120 may be movable along a track built into the chassis 110. In some examples, this track may provide power and/or data to the I/O connectors 120.

Figure 2:
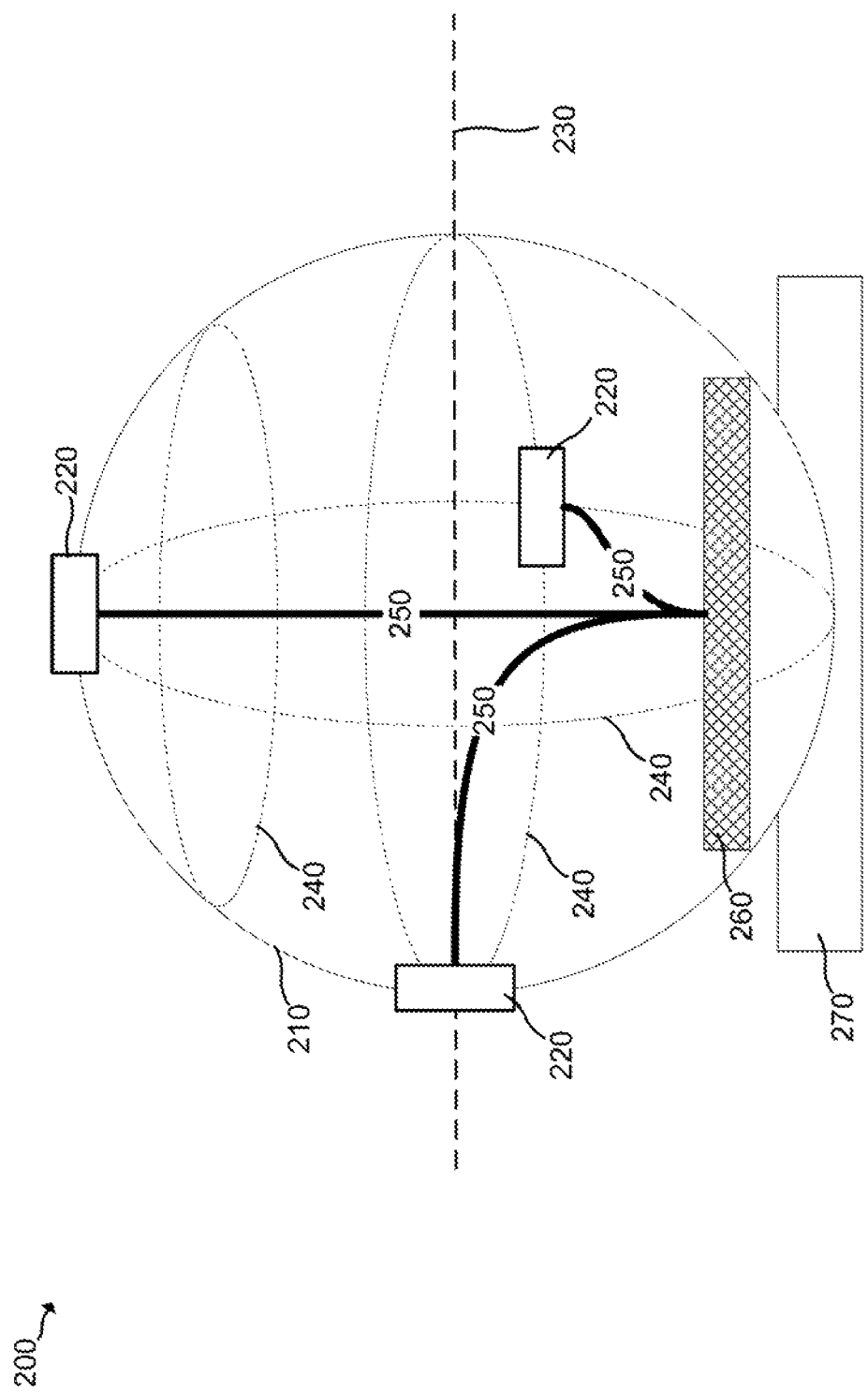
FIG. 2 is a block diagram of a desktop computing device with movable input/output connectors.

FIG. 2 is a block diagram of a desktop computing device 200 with movable I/O connectors 220. The desktop computing device 200 may be any suitable desktop computing device (e.g., computing device 100 of FIG. 1) and may include a cover 210, which may serve as the cover to the desktop computing device 200, similar to the chassis 110 of FIG. 1. The cover 210 may be circular or spherical in shape.

The desktop computing device 200 may also include any number of I/O connectors 220 to connect an I/O device to the desktop computing device 200, similar to the I/O connectors 120 of FIG. 1. Each I/O connector 220 may be movable along a track 240 about any suitable axis relative to the cover 210 by at least 180 degrees (e.g., axis 230) such that the I/O connector 220 is accessible from multiple sides of the desktop computing device 200. For example, the axis 230 may run through the center of the desktop computing device 200, and the I/O connectors 220 may be movable about the axis 230 by at least 180 degrees.

The desktop computing device 200 may also include motherboard 260 to perform the computing functions of the desktop computing device 200. The motherboard 260 may be any suitable motherboard and may communicate with any peripheral devices plugged into and/or in communication with each I/O connector 220, where the motherboard 260 may communicate occur through a bus 250 that provides data communication between the motherboard 260 and any devices connected to the I/O connectors 220.

In some examples, the desktop computing device 200 may also include a stand 270, which may be any suitable stand to support the desktop computing device 200 such that the desktop computing device 200 may stably sit on a surface (e.g., a tabletop).

Figure 3:
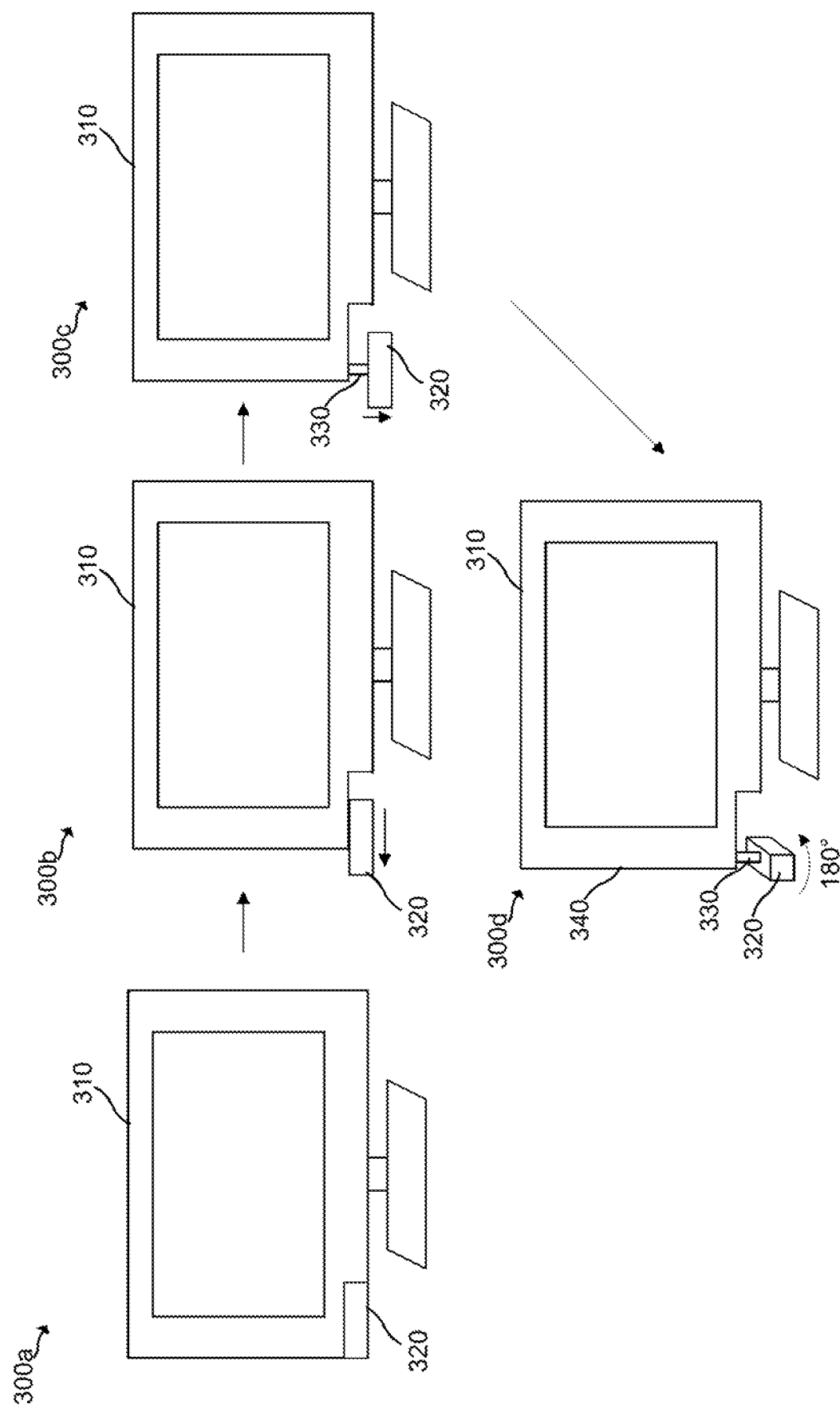
FIG. 3 is a block diagram of a monitor with movable input/output connectors.

FIG. 3 is a block diagram of a monitor 300 with movable I/O connectors 320. Similar to the computing device 100 of FIG. 1, the monitor 300 of FIG. 3 may include a chassis 310 of the monitor 300, which may service to cover the monitor 300.

The monitor 300 may include any number of I/O connectors 320 to connect an I/O device to the monitor 300, similar to the I/O connectors 120 of FIG. 1. Each I/O connector 320 may be movable about an axis relative to the chassis 310 by at least 180 degrees (e.g., axis 330) such that the I/O connector 320 is accessible from the front, side, and rear of the monitor 300.

For example, the monitor 300*a* shows the I/O connectors 320 in a default state, where the I/O connectors 320 are close to the chassis 310. To change the position of the I/O connectors 320, the monitor 300*b* shows that the I/O connectors 320 may be moved outward from the chassis 310. The I/O connectors 320 may also be moved downward from the chassis 310, as shown on the monitor 300*c*. The monitor 300*d* shows that the I/O connectors 320 may then be rotated about the axis 330, where the axis 330 may be parallel to a side wall 340 of the monitor 300.

What is claimed is:

1. A computing device, comprising:
  a chassis of the computing device, wherein the chassis comprises multiple sides, the multiple sides correspond to different portions of an exterior surface of the computing device, the multiple sides comprise a first side coinciding with a first portion of the exterior surface and a second side coinciding with a second portion of the exterior surface, the first portion of the exterior surface having a first surface normal, the second portion of the exterior surface having a second surface normal, and the first surface normal has an angular separation of at least 180 degrees from the second surface normal;
  a track to extend along a path that coincides with the first side and the second side; and
  an input/output (I/O) connector to connect an I/O device to the computing device, wherein the I/O connector is mounted to the track such that translation of the I/O connector along the track causes the I/O connector to move about an axis corresponding to the chassis by at least 180 degrees such that the I/O connector is accessible from at least the first side and the second side.

2. The computing device of claim 1, wherein the computing device is a monitor.

3. The computing device of claim 2, wherein the axis is parallel to a side wall of the monitor.

4. The computing device of claim 1, wherein the computing device is a desktop tower.

5. The computing device of claim 4, wherein the desktop tower is rectangular and wherein the axis is parallel to a top wall of the desktop tower.

6. The computing device of claim 4, wherein the desktop tower is circular and wherein the axis runs through a center of the desktop tower.

7. The computing device of claim 1, further comprising:
  an additional I/O connector to connect another I/O device to the computing device, wherein the additional I/O connector is movable about the axis or a different axis.

8. The computing device of claim 1, wherein the track is to provide power or data to the I/O connector.

9. A desktop computing device, comprising:
  a cover of the desktop computing device, wherein the cover comprises a plurality of sides, the plurality of sides correspond to different portions of an exterior surface of the cover, the plurality of sides comprise a first side coinciding with a first portion of the exterior surface and a second side coinciding with a second portion of the exterior surface, the first portion of the exterior surface having a first surface normal, the second portion of the exterior surface having a second surface normal, and the first surface normal has an angular separation of at least 180 degrees from the second surface normal;
  a guide to extend along a path that coincides with the first side and the second side; and
  an input/output (I/O) connector to connect an I/O device to the desktop computing device, wherein the I/O connector is mounted to the guide such that translation of the I/O connector along the guide causes the I/O connector to be positioned at the first side and the second side.

10. The desktop computing device of claim 9, wherein the guide comprises a track that provides power or data to the I/O connector.

11. The desktop computing device of claim 9, wherein the cover comprises a rectangular cover having a plurality of walls, and the plurality of walls comprises a first wall corresponding to the first side and a second wall corresponding to the second side.

12. The desktop computing device of claim 9, wherein the cover has a curved shape, and the guide conforms to the curved shape of the cover.

13. A monitor, comprising:
  a chassis of the monitor, wherein the chassis comprises a front, a side and a rear;
  a curvilinear track; and
  an input/output (I/O) connector to connect an I/O device to the monitor, wherein the I/O connector is mounted to the track such that movement of the I/O connector along the track causes the I/O connector to be positioned at each of at least two locations, the at least two locations corresponding to at least two of the front, the side and the rear of the chassis.

14. The monitor of claim 13, wherein the track is spatially offset from an axis, the track extends at least 180 degrees about an axis, and the axis is parallel to a side wall of the monitor.

15. The monitor of claim 13, wherein the I/O connector includes a high-definition multimedia interface (HDMI) connector, an audio connector, a universal serial bus (USB) connector, or an alternating current (AC) connector.

16. The computing device of claim 1, wherein the track extends in a curved path at least 180 degrees about the axis.

17. The computing device of claim 1, wherein the chassis comprises a top wall and a side wall, and
  the track is oriented such that translation of the I/O connector along the track allows the I/O connector to move from a position corresponding to the side wall of the chassis to a position corresponding to the top wall of the chassis.

18. The desktop computing device of claim 9, wherein the guide is oriented in the desktop computing device such that translation of the I/O device allows the I/O connector to move between a rear of the desktop computing device associated with a first side of the plurality of sides of the cover and a front of the desktop computing device associated with a second side of the plurality of sides of the cover other than the first side.

19. The desktop computing device of claim 9, wherein the plurality of sides of the cover are associated with side walls of the desktop computing device, and the guide is arranged to allow translation of the I/O device along the guide to move the I/O device between a position corresponding to a first side wall of the side walls to a position corresponding to another side wall of the side walls.

20. The monitor of claim 13, wherein the track provides at least one of power or data to the I/O connector.

21. The computing device of claim 1, wherein:
   the track comprises a curvilinear track; and
   the I/O connector is to mounted to the track such that curvilinear motion of the I/O connector along the track moves the I/O connector from a first position of the track coinciding with the first side to a second position of the track coinciding with the second side.

\* \* \* \* \*